United States Patent [19]
Berto

[11] Patent Number: 6,030,572
[45] Date of Patent: Feb. 29, 2000

[54] METHOD FOR MAKING A PLASTIC AGGREGATE

[75] Inventor: Terrance Donald Berto, Port Coquitlam, Canada

[73] Assignee: Environmentally Engineered Concrete Products, Inc., Seattle, Wash.

[21] Appl. No.: 08/979,086

[22] Filed: Nov. 26, 1997

[51] Int. Cl.⁷ ............................... B05D 3/06; B05D 7/02
[52] U.S. Cl. .......................... 264/446; 264/447; 264/131; 264/911; 264/918; 427/558; 427/180; 427/222
[58] Field of Search .................................. 264/405, 446, 264/447, 131, 911, 918, 919; 427/508, 510, 512, 558, 553, 554, 180, 222

[56] References Cited

U.S. PATENT DOCUMENTS

| | | | |
|---|---|---|---|
| 4,058,406 | 11/1977 | Raponi . | |
| 4,174,993 | 11/1979 | Fujii et al. . | |
| 4,287,241 | 9/1981 | Kaufmann . | |
| 4,339,566 | 7/1982 | Rosenkranz et al. . | |
| 4,343,669 | 8/1982 | Prior . | |
| 4,427,818 | 1/1984 | Prusinski . | |
| 4,504,318 | 3/1985 | Matsuda et al. . | |
| 4,525,500 | 6/1985 | Lynn . | |
| 4,801,217 | 1/1989 | Goldberg . | |
| 5,162,060 | 11/1992 | Bredow et al. . | |
| 5,209,968 | 5/1993 | Sweeney . | |
| 5,468,539 | 11/1995 | Crivelli . | |
| 5,599,857 | 2/1997 | Allen . | |
| 5,624,980 | 4/1997 | Kobori . | |
| 5,786,080 | 7/1998 | Andersen et al. | 427/180 |
| 5,874,482 | 2/1999 | Yamagata et al. | 528/489 |
| 5,879,600 | 3/1999 | Symons | 264/110 |

*Primary Examiner*—Karen Aftergut
*Attorney, Agent, or Firm*—Oyen Wiggs Green & Mutala

[57] ABSTRACT

A method for producing a plastic aggregate for use in concrete compositions includes exposing high density plastics to ultraviolet irradiation in the presence of a strong alkali. The plastic may be recycled plastic which has been washed and cut into strips. Plastic aggregates according to the invention have an increased affinity for common concrete binders such as portland cement. A cement composition made with such plastic aggregates may include up to 60% by volume of plastic aggregate. The plastic aggregates are well adapted for use in concrete compositions used to make pre-cast concrete components.

17 Claims, 4 Drawing Sheets

6,030,572

METHOD FOR MAKING A PLASTIC AGGREGATE

FIELD OF THE INVENTION

This invention relates to aggregates for use in concrete and to methods for preparing high density plastic materials for use as concrete aggregates. The invention also relates to methods for making concrete compositions and structures which incorporate such aggregates.

BACKGROUND OF THE INVENTION

Concrete has been, and is, one of the most widely used building materials. Concrete is a mixture of an aggregate and a binder. Portland cement is a common binder. Gravel is often used as an aggregate. The aggregate and binder are mixed together with a hydrating agent, such as water. Upon hydration the binder solidifies and binds the aggregate together into a solid mass.

Various inventors have proposed using plastic particles as aggregates to produce concrete which is less dense than concrete made using conventional gravel aggregates. For example, Raponi, U.S. Pat. No. 4,058,406 discloses a cementitious composition which contains waste polyethylene strips. Sweeney, U.S. Pat. No. 5,209,968 discloses a building panel having a core made from scrap or waste plastic and a cementitious slurry binder. The core in the Sweeney panel is sandwiched between a pair of high strength outer layers.

A problem with the use of plastic materials for aggregates in concrete compositions is that most common binders, such as portland cement, do not adhere well to common plastics. The result is a concrete material which is significantly weaker than ordinary concrete. This a particular problem in mixes which contain relatively large proportions of plastic aggregates. Concretes using plastic aggregates have generally been confined to uses in which strength is not required and to mixes having relatively low volumetric ratios of plastic aggregates.

There is a persistent need for strong low density concrete formulations that are not unduly expensive. There is also a persistent need for a way to reuse ex-consumer plastic materials.

SUMMARY OF THE INVENTION

One aspect of the invention provides a method for making a fibrous aggregate for use in concrete. The method comprises the steps of providing pieces of plastic; placing the plastic pieces in an alkaline environment; exposing the plastic pieces to ultraviolet radiation having wavelengths in the range of 290 nm to 380 nm; and, rinsing the plastic pieces. Preferably the alkaline environment comprises an alkaline solution. Preferably the alkaline solution comprises a solution of aluminum hydroxide or calcium hydroxide. The step of providing pieces of plastic preferably comprises: obtaining recycled high density plastic articles; washing the articles; and slicing the articles into strips. The articles may comprise, for example, milk jugs, soft drink bottles, yogurt containers, ice cream containers and margarine tubs. The step of exposing the plastic pieces to ultraviolet radiation preferably comprises introducing the alkaline solution containing the plastic pieces into a shallow container, illuminating a surface of the alkaline solution with an ultraviolet lamp having substantially continuous coverage in the wavelength range of 290 nm to 380 nm and agitating the alkaline solution in the shallow container.

A second aspect of the invention provides a plastic aggregate for use in making fibrous concrete. The plastic aggregate is produced by a process comprising the steps of: providing pieces of plastic; placing the plastic pieces into an alkaline solution; exposing the plastic pieces to ultraviolet radiation having wavelengths in the range of 290 nm to 380 nm; and, rinsing the plastic pieces. The plastic aggregate so produced is characterized by a roughened surface and a high affinity for portland cement.

BRIEF DESCRIPTION OF THE DRAWINGS

In drawings which illustrate specific embodiments of the invention, but which should not be construed as restricting the spirit or scope of the invention in any way.

DETAILED DESCRIPTION

Figure 1:
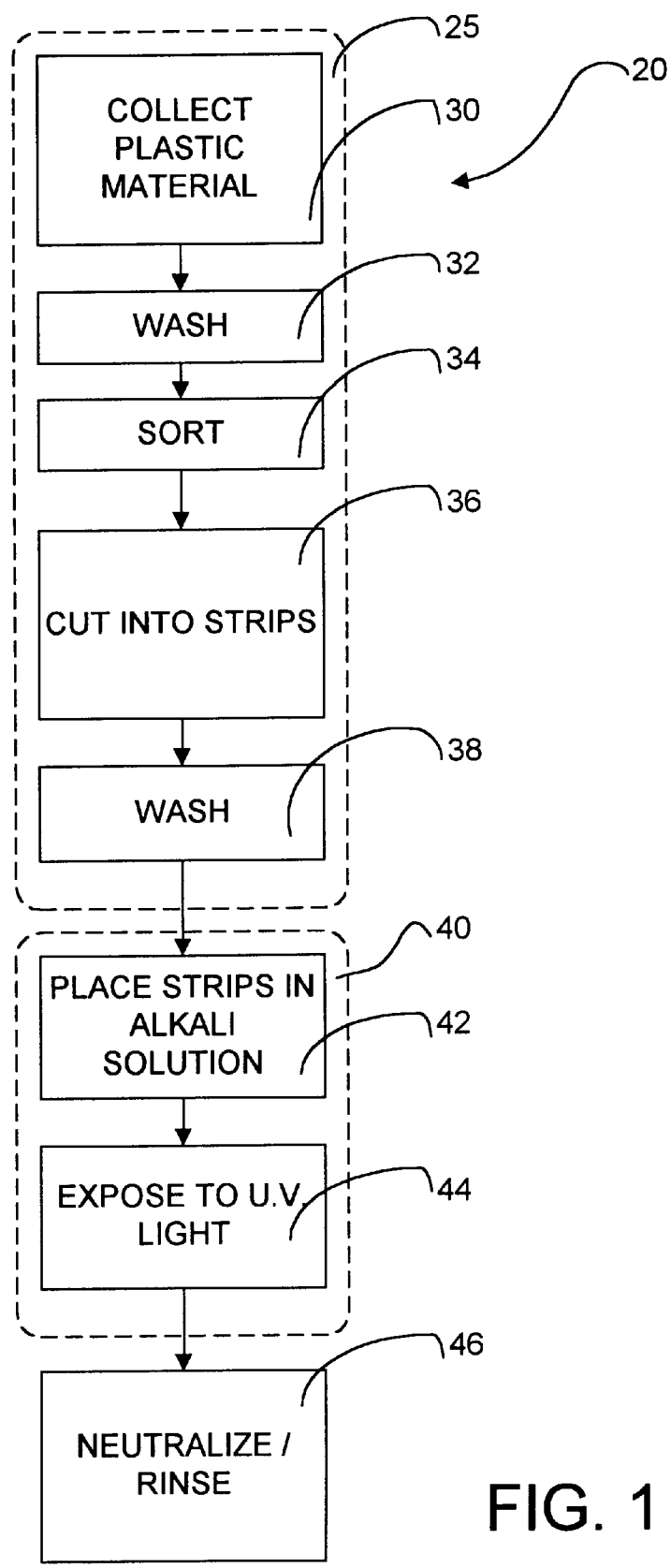
FIG. 1 is a flow chart illustrating a sequence of steps in preparing a plastic aggregate according to the invention.
Figure 2:
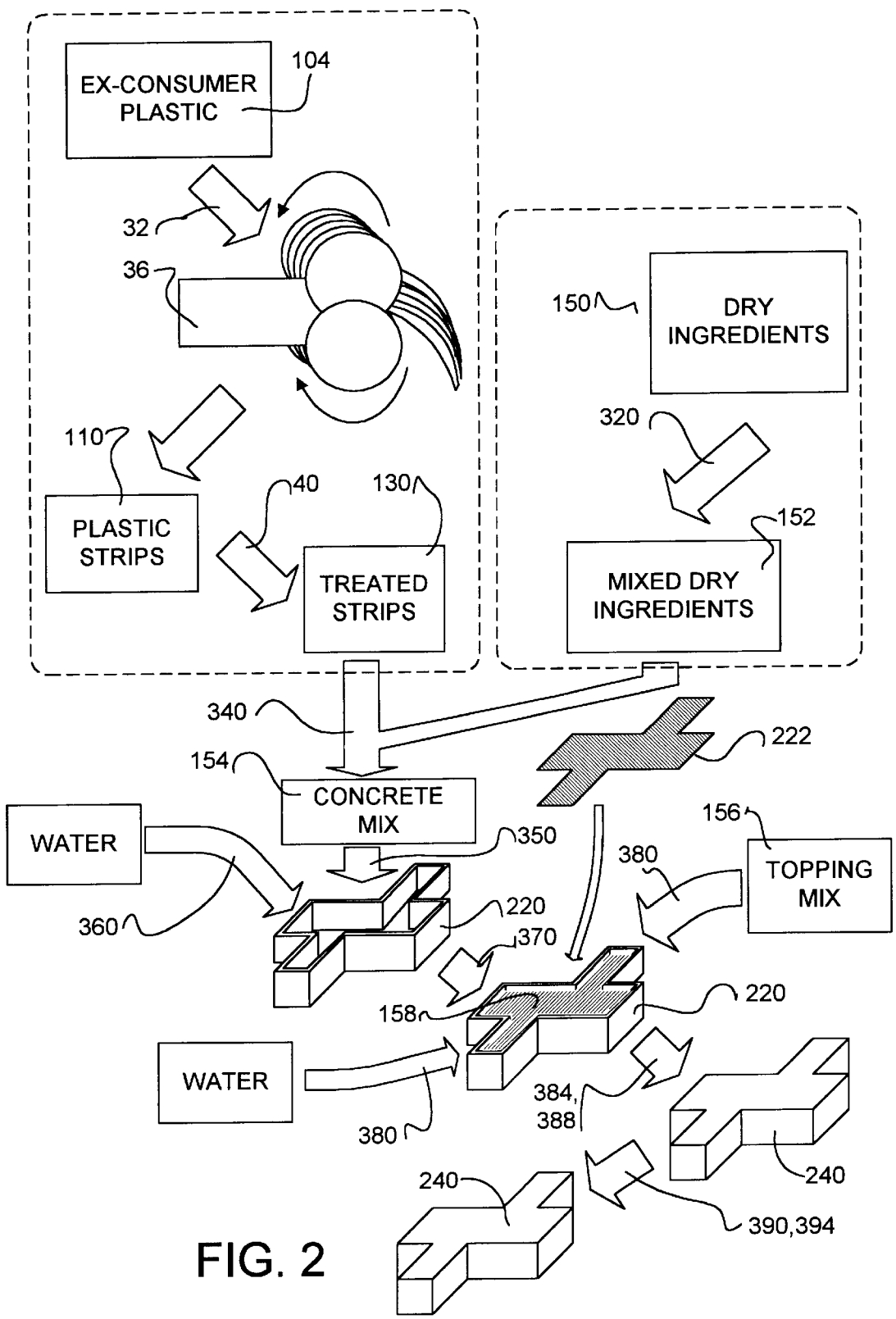
FIG. 2 is a schematic chart illustrating various intermediate stages in the production of a plastic aggregate by the method of FIG. 1 and the use of that plastic aggregate in the production of pre-cast concrete components.

This invention provides a method 20 for making a fibrous plastic aggregate 130 for use in making fibrous concrete compositions. FIG. 1 illustrates the steps in method 20. FIG. 2 shows intermediate stages in method 20.

Method 20 begins by providing (step 25) a high density plastic material. The plastic material may, for example, comprise polycarbonates, PVC, ABS, or other high density plastics. The plastic materials should not include any foams or plastic films. Most preferably the plastic material is provided by the steps of collecting recycled plastic 104, such as plastic milk jugs, plastic ice cream pails, plastic yogurt containers, plastic soft drink bottles, plastic margarine tubs, and the like (step 30). Virtually any of the high density plastic containers in which domestic products are currently distributed may be used in step 30. The recycled plastics are preferably sorted by shape and size (step 34) to facilitate cutting, as described below. It is not necessary to sort the plastic by type of plastic. Either before or after sorting (step 34) the recycled plastic is washed (step 32) to remove labels, grease and other contaminants which are typically adherent to ex-consumer plastics. The washing is preferably done in a heated caustic solution, such as a heated solution of caustic soda (sodium hydroxide) in water.

The sorted plastics are then cut into strips 110 (step 36). This may be achieved by cutting the plastic using, for example, a rotary shear. In step 36 the plastic is preferably cleanly cut into strips 110 no more than approximately ½ inch (1.2 cm) wide. Strips 110 are then cut into random lengths. Strips 110 preferably have lengths in the range of about 2 inches to about 8 inches. Cutting step 36 is facilitated if the recycled plastics being cut up have previously been sorted by shape and size in step 34. Strips 110 produced by cutting step 36 are washed again in a caustic solution and rinsed with water to remove any residual grease or other contaminants (step 38). The result of step 38 is a mixture of clean strips 110 of high density plastic. Strips 110 may comprise strips made up of several different types of plastic.

The invention is not confined to plastic aggregate in the form of strips. Other shapes of plastic may be used in place of strips 110. Strips 110 are, however, a good way to configure plastic for use in the invention.

Strips 110 are then treated (step 40) to enhance their affinity for a concrete binder. Step 40 comprises exposing strips 110 to ultraviolet light in the presence of a strong alkali. Most preferably step 40 comprises mixing cleaned strips 110 into a solution 120 which comprises an alkali compound in a suitable solvent (step 42). Most preferably the solvent is hot water. Most preferably the alkali compound is selected from the group consisting of aluminum hydroxide and calcium hydroxide. Most preferably the alkali solution is saturated. Most preferably the solution also includes some oxide pigment of the type typically used to color concrete. It is thought that the presence of some oxide pigment will enhance the process.

Figure 3:
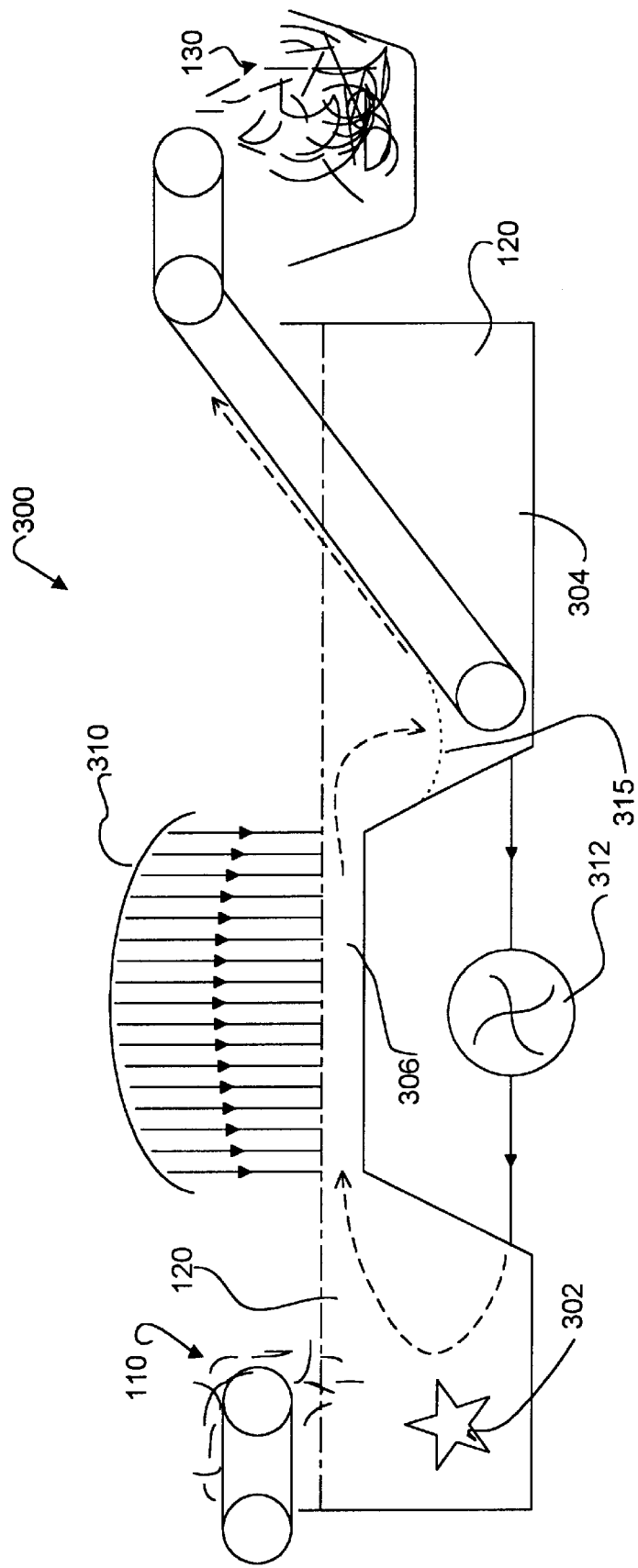
FIG. 3 is a schematic view of apparatus for making plastic aggregates according to the invention; and, FIG. 4 is a flow chart illustrating a sequence of steps for preparing a pre-cast concrete component according to the invention.

While they are wetted by alkali solution 120, strips 110 are exposed to a very intense source of ultraviolet light (step 44). The ultraviolet light may be provided by an ultraviolet lamp 310 (FIG. 3). Ultraviolet lamp may comprise, for example, a bank of metal halide lamps. The ultraviolet light produced by lamp 310 preferably has a substantially continuous wavelength spectrum in the range of 310 nm to 364 nm and most preferably has a substantially continuous wavelength spectrum in the range of 290 nm to 380 nm.

The ultraviolet light promotes a chemical reaction between solution 120 and strips 110. The reaction etches the surfaces of strips 110 and also alters the chemical make up of the surface of plastic strips 110. It is thought that this chemical reaction involves substituting cations from solution 120 for hydrogen atoms in the plastic material of strips 110. It is preferable to maintain a warm temperature during step 44 as the rate at which the reaction progresses is accelerated by heat.

The resulting treated plastic strips 130 have a better chemical affinity for common binders, such as portland cement, than untreated plastic strips 110. Furthermore, the roughened etched surfaces of treated plastic strips 130 allow cement to grip plastic strips better than cement could grip smooth plastic surfaces such as the surfaces of untreated strips 110. Step 44 is continued for a short enough time that only surface portions of strips 110 are significantly affected by this treatment. Strips 110 retain most of their tensile strength.

Because ultraviolet lamp 310 emits radiation over a wavelength band, step 40 is not limited to a particular type of plastic material. Thus, step 40 may be carried out even though various ones of plastic strips 110 may be made of different types of plastic. If plastic strips 110 were all made of the same type of plastic then ultraviolet lamp 310 could be of a type which emits ultraviolet radiation in a narrower band selected to promote a reaction between alkali solution 120 and the particular material of plastic strips 110.

Preferably step 40 is carried out in apparatus 300 (FIG. 3) which includes a tank 304 for holding solution 120 and an agitator 302 in tank 304 for stirring solution 120 to ensure that plastic strips 110 are all thoroughly wetted and all have all surfaces evenly exposed to ultraviolet light during step 44. Solution 120 flows from tank 304 through a shallow channel 306 past lamp 310. A pump 312 may be provided to cause solution 120 to flow through channel 306. Suitable screens 315 are provided to prevent plastic strips 110 from passing through apparatus 300 multiple times.

Lamp 310 illuminates solution 120 in channel 306 (step 44). Preferably solution 120 is vigorously stirred in channel 306 so that all surfaces of the strips 110 which are in channel 306 are evenly exposed to ultraviolet radiation from lamp 310 as they pass through channel 306. Channel 306 should preferably be about 12 inches or less in depth.

After strips 110 have passed through channel 306 and been exposed to ultraviolet light (to convert them into treated strips 130) then treated strips 130 are removed from solution 120, rinsed in water to remove any remaining alkali materials from their surfaces (step 46) and dried. The dried treated strips 130 may then be used as a fibrous aggregate in concrete, as described below. Strips 130 may be used immediately or may be stored indefinitely. It can be appreciated that the methods of this invention may be used to provide a use for ex-consumer plastics which are otherwise difficult to dispose of An alkaline environment for practising step 44 may be provided under dry conditions as well as in a solution 120. For example, strips 110 may be coated in a finely dispersed powder of an alkaline material and then exposed on both sides to an ultraviolet light source, as described above. The alkaline material is preferably either aluminum hydroxide or calcium hydroxide. Most preferably strips 110 are slightly dampened with a solvent, such as paint thinner, to cause the alkaline powder to adhere to their surfaces. Most preferably the powder includes a small proportion of an oxide pigment of the type typically used for coloring concrete. The resulting treated strips 130 may then be rinsed and dried as explained above.

Figure 4:
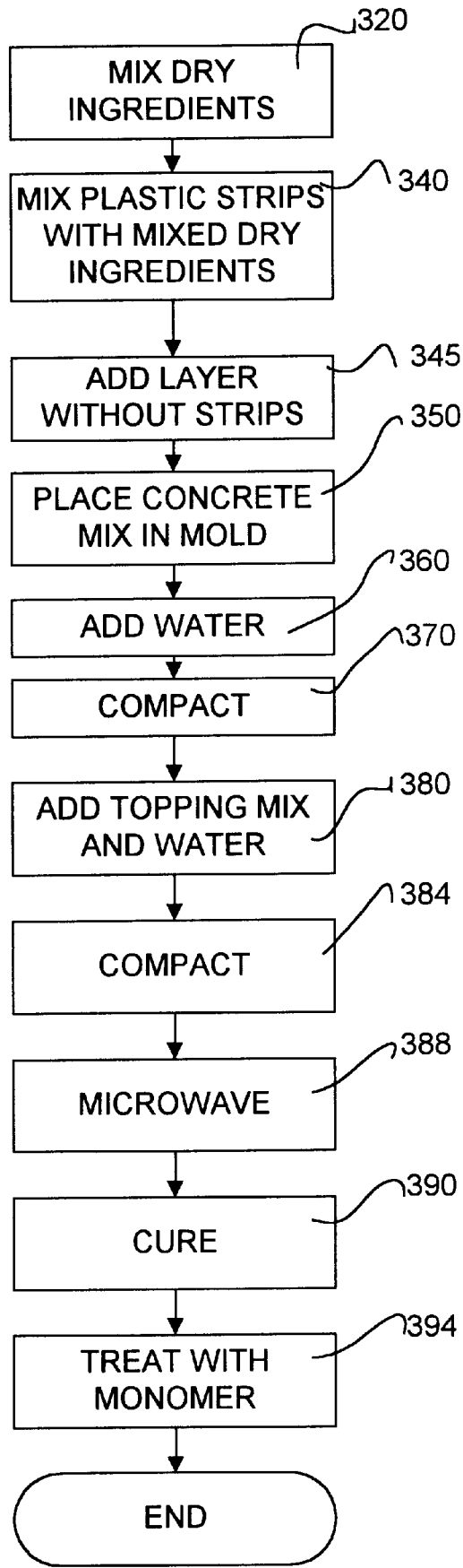

Dried treated strips 130 may be used in making a fibrous concrete material as illustrated in FIGS. 2 and 4. A typical concrete material comprises a number of dry ingredients. The dry ingredients may comprise, for example, a hydraulic cement, such as portland cement, fines, such as sand, various surfactants and accelerating agents, pigments, and so on. Preferably the dry ingredients 150 other than strips 130 are first mixed together (step 320) in the desired proportions in a suitable dispensing system. Mixing dry ingredients 150 before adding strips 130 prevents strips 130 from interfering with the accurate apportioning of dry ingredients 150. Various dispensing systems for measuring and mixing dry ingredients 150 for concrete in the desired proportions are known to those skilled in the concrete mixing art and will therefore not be described here in detail. By way of example, the ingredients may be dispensed in measured amounts from storage hoppers into a ribbon blender mixing unit.

The mixed dry ingredients 152 are then mixed in a desired volumetric ratio with plastic strips 130 (step 340) to produce a dry concrete mix 154. Step 340 is preferably carried out in a separate mixer from step 320. The resulting concrete mix may be mixed with water to produce a fibrous concrete which may be used in any of many applications. Because treated plastic strips 130 have an enhanced affinity for hydraulic cements, plastic strips 130 may be used in larger proportions than would be possible with other plastic aggregate materials. For example, it is thought that viable concrete compositions comprising up to 60% plastic strips 130 by volume may be made.

Fibrous concrete according to the invention is particularly good for making pre-cast concrete components. While concrete compositions incorporating treated plastic strips 130 may be used in conventional ways used to make pre-cast concrete components it is thought that the methods described below are particularly advantageous for making pre-cast concrete components with the concrete compositions of the invention.

If it is desired to fabricate pre-cast concrete components then a measured amount of the mixture 154 of plastic strips 130 and other dry ingredients 150 is introduced into a mold 220 (step 350). Prior to or during step 350 plastic strips 130 are preferably generally aligned with each other so that they may be introduced into mold 220 in an orientation that will produce a strong final component 240. Generally the engineer who designs component 240 will specify the preferred orientation of plastic strips 130 in different portions of component 240. In general, the strength of a component 240 can be increased by designing component 240 so that plastic strips 130 are oriented in different directions in adjoining layers within component 240 much in the same way that plywood gains strength by having the grain in adjacent plies oriented in different directions.

Most preferably a thin layer of any suitable concrete material which lacks any plastic strips 130 is deposited in mold 220 (step 345) before the addition of mixture 154. This layer merely prevents any of plastic strips 130 from protruding through the lower surface of the finished component 240.

Mold 220 is preferably made from a plastic material that does not adhere well to cement. Most preferably mold 220 is made from a material, such as a suitable polyethylene, that is substantially transparent to and is not harmed by microwaves. A measured amount of water is introduced into mixture 154 (step 360). The water is preferably added to mixture 154 at the same time as mixture 154 is introduced into mold 220 and is dispersed in, for example, a fine mist, so as to dampen each part of mixture 154 as that part of mixture 154 enters mold 220 just enough to hydrate that part of mixture 154.

The concrete mixture in the mold 220 is then compacted (step 370) to reduce porosity in the concrete mixture in mold 220 and to ensure that the water added during step 360 is evenly distributed throughout the mixture 154 in mold 220. Step 370 preferably involves both vibrating and compressing the concrete mixture. This may be done in an automated press. The press should simultaneously vibrate the contents of mold 220 and press down on the upper surface of the contents of mold 220.

After compaction step 370, mold 220 is topped up (step 380) with a topping mixture 156 which does not include any plastic strips 130.

The topping mixture may, for example, be a mixture of dry ingredients 150 and silica sand. Additional water to provide for complete hydration of the concrete in mold 220 may be added with topping mixture 156. The total weight of water added in steps 360 and 380 should not exceed about 30% of the weight of cement in mold 220.

A top 222 is then placed on mold 220 and the contents 158 of mold 220 are subjected to a second compaction step 384. In step 384 top 222 is vibrated and pressed downwardly into mold 220 to remove any voids from the layer comprising topping mixture 156. Preferably the composition of the concrete mixture in mold 220 is checked by comparing the volume and weight of concrete mixture in mold 220 to the designed for values. The check may also, or instead, compare the resistance presented by the contents of mold 220 to the downward motion of top 222 at specific distances above a reference point on mold 220. If this check indicates that there is a flaw in the composition of the concrete mixture in mold 220 then that mold 220 may be dumped and refilled.

Mold 220 is then exposed to microwaves to raise the temperature of water in mold 220 and to thereby accelerate the setting of material in mold 220 (step 388). Preferably the temperature of water in mold 220 is rapidly increased to about 80° C. during this step. After step 388 the concrete in mold 220 is allowed to set in mold 220 for a period, for example about ¾ hours to yield a concrete component 240 in mold 220. Concrete component 240 is then removed from mold 220.

Next concrete component 240 is cured (step 390). Typically the curing step involves storing component 240 at 100% relative humidity for about 7–10 days in a temperature and humidity controlled environment. Most preferably the temperature is maintained reasonably constant in the range of about 60 to 90 degrees Fahrenheit. After component 240 has cured then component 240 may optionally be treated with a monomer (step 394) to make component 240 stronger and less porous. Those skilled in the art will be familiar with various monomers that may be used to treat concrete components. Essentially step 394 involves drying component 240, dipping component 240 into a monomer/initiator solution to allow the monomer/initiator solution to penetrate into pores in component 240. Component 240 is then introduced into a hot water chamber to allow the monomer to polymerize within the pores of component 240. The mechanics of this step 394 are conventional and will not be described here in detail. Any of several commercially available monomer systems may be used according to the standard techniques for using such monomer systems.

Finally concrete component 240 can be shrink wrapped and palletized for shipping.

Those skilled in the art will readily appreciate that much of the processes described above for producing plastic aggregates and for producing pre-cast concrete components which incorporate such aggregates may be automated to best exploit the invention on a commercial scale. For example, steps 350 and 360 could involve the use of an automatic device to meter calculated amounts of concrete mix 154 and water into mold 220. Mold 220 could be carried by a suitable conveyor system to other stations for subsequent operations.

The plastic aggregate 130 of the invention can be used in various concrete compositions. An advantage of plastic aggregates according to the invention is that such aggregates may form a greater proportion of a concrete mix than is possible with prior plastic aggregates. In general, a concrete composition according to the invention comprises: a hydraulic cement, such as portland cement, in a proportion in the range of 20% to 60% by weight of the total composition; fines, which may, for example, comprise sand, in a proportion in the range of 20% to 50% by weight of the total composition; treated plastic aggregate (e.g. strips 130) in a proportion in the range of 5% to 40% by weight of the total composition; and water in a proportion in the range of 7% to 20% by weight of the total composition.

EXAMPLE 1

A batch of concrete was made by mixing the following proportions, by weight, of the following materials: portland cement 30%; crushed perlite 30%; plastic aggregate 30%; and water 10%. The plastic aggregate is consisted of treated strips approximately ¼ inches wide and 6 inches to 8 inches long. The concrete was formed into a tile approximately 6 inches wide, 12 inches long and ¾ inches thick and allowed to cure for 7 days. Some strips were oriented transversely and other strips were oriented longitudinally in the tile. The weight of the cured tile was 2¼ pounds. No shrink cracking of the tile was observed. When force was applied to the flat surface of the tile the tile experienced gradual failure. The overall structural integrity of the tile outside of the area of the failure was maintained. It was observed that cement appeared to be adhering well to the treated plastic strips.

COMPARATIVE EXAMPLE 1

A batch of concrete was made according to the mix of Example 1. However, untreated plastic strips were used instead of plastic aggregate according to the invention. The concrete was otherwise treated identically to the concrete of Example 1. The concrete tile so formed also had a weight of 2¼ pounds. This tile suffered from severe shrink cracking. When force was applied to this tile in the same manner as the tile of Example 1, the tile failed at a significantly lower force. The failure caused the tile to crumble.

COMPARATIVE EXAMPLE 2

In the concrete mixture of Example 1, the treated plastic aggregate was replaced with perlite. A tile formed from this concrete composition and subjected to force in the same manner as the tile of Example 1 failed suddenly and crumbled into pieces.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. A method for making an aggregate for use in concrete, the method comprising the steps of:

a) providing pieces of plastic;

b) placing the plastic pieces into an alkaline environment;

c) exposing the plastic pieces to ultraviolet radiation having wavelengths in a range of 290 nm to 380 nm; and, d) removing the pieces from the alkaline environment.

2. The method of claim 1 comprising the step of rinsing the plastic pieces after the step of removing the pieces from the alkaline environment.

3. The method of claim 2 wherein the alkaline environment comprises an alkaline solution.

4. The method of claim 3 wherein the alkaline solution consists essentially of a solution of an alkali in a solvent.

5. The method of claim 3 wherein the alkaline solution comprises a solution of an alkali and an oxide pigment in a solvent.

6. The method of claim 4 wherein the solvent consists essentially of water.

7. The method of claim 4 wherein the alkali consists of an alkali selected from the group consisting of aluminum hydroxide and calcium hydroxide.

8. The method of claim 7 wherein the solvent consists essentially of water.

9. The method of claim 8 wherein the step of providing pieces of plastic comprises: obtaining recycled high density plastic articles; washing the articles; and slicing the articles into strips.

10. The method of claim 9 wherein the recycled high density plastic articles are selected from the group consisting of: milk jugs, soft drink bottles, yogurt containers, ice cream containers and margarine tubs.

11. The method of claim 1 wherein the step of providing pieces of plastic comprises: obtaining recycled high density plastic articles; washing the articles; and slicing the articles into strips.

12. The method of claim 11 wherein the recycled high density plastic articles are selected from the group consisting of: milk jugs, soft drink bottles, yogurt containers, ice cream containers and margarine tubs.

13. The method of claim 2 wherein placing the plastic pieces into an alkaline environment comprises placing the plastic pieces in an alkaline solution, and, exposing the plastic pieces to ultraviolet radiation comprises introducing the alkaline solution containing the plastic pieces into a shallow container, illuminating a surface of the alkaline solution with an ultraviolet lamp having substantially continuous coverage in a wavelength range of 310 nm to 364 nm and agitating the alkaline solution in tile shallow container.

14. The method of claim 2 wherein exposing the plastic pieces comprises illuminating the plastic pieces with an ultraviolet lamp having substantially continuous coverage in the wavelength range of 290 nm to 380 nm.

15. The method of claim 1 wherein the step of placing the plastic pieces in an alkaline environment comprises coating the plastic pieces with a finely divided powder of an alkali material.

16. The method of claim 1 wherein the step of placing the plastic pieces in an alkaline environment comprises coating the plastic pieces with a finely divided powder of an alkali material intermixed with at least some oxide pigment.

17. The method of claim 1 wherein the plastic pieces comprise strips having lengths in a range of 2 inches to 8 inches and widths of no more than about ½ inch.

* * * * *